United States Patent
Itoh

(10) Patent No.: US 7,283,581 B2
(45) Date of Patent: Oct. 16, 2007

(54) SPREAD SPECTRUM COMMUNICATION SYSTEM APPARATUS

(75) Inventor: Katsutoshi Itoh, Tokyo (JP)

(73) Assignee: Sony Corporation, Tokyo (JP)

( * ) Notice: Subject to any disclaimer, the term of this patent is extended or adjusted under 35 U.S.C. 154(b) by 852 days.

(21) Appl. No.: 10/343,466

(22) PCT Filed: May 30, 2002

(86) PCT No.: PCT/JP02/05267

§ 371 (c)(1),
(2), (4) Date: Jun. 27, 2003

(87) PCT Pub. No.: WO02/099989

PCT Pub. Date: Dec. 12, 2002

(65) Prior Publication Data

US 2004/0037351 A1 Feb. 26, 2004

(51) Int. Cl.
*H04B 1/00* (2006.01)

(52) U.S. Cl. .................................... 375/147

(58) Field of Classification Search ................ 375/147, 375/140, 130, 377
See application file for complete search history.

(56) References Cited

U.S. PATENT DOCUMENTS

| 5,544,156 A | 8/1996 | Teder et al. |
| 5,889,768 A | 3/1999 | Storm et al. |
| 6,539,211 B1 * | 3/2003 | Abrishamkar et al. ... 455/161.2 |
| 6,839,380 B1 * | 1/2005 | Ding et al. ................. 375/149 |
| 6,879,623 B2 * | 4/2005 | Agami et al. ............... 375/140 |

FOREIGN PATENT DOCUMENTS

| EP | 0 661 829 | 7/1995 |
| EP | 0 822 668 | 2/1998 |
| EP | 1 039 648 | 9/2000 |
| EP | 1 079 537 | 2/2001 |
| JP | 10-79720 | 3/1998 |
| JP | 2000-252866 | 9/2000 |
| JP | 2001-16135 | 1/2001 |
| WO | WO 00 25530 | 5/2000 |

* cited by examiner

*Primary Examiner*—Pankaj Kumar
(74) *Attorney, Agent, or Firm*—Frommer Lawrence & Haug LLP; William S. Frommer; Thomas F. Presson

(57) ABSTRACT

A receiving apparatus eliminating the need for performing at all times a function provided for a mode that is most susceptible to deterioration in accuracy in adaptive modulation communication. In a spread spectrum communication system according to the present invention, a control unit reads a demodulating method from a control signal specifying the demodulating method, and on the basis of the read demodulating method, the control unit controls a sampling rate of an A/D conversion unit and a despreading unit, a number of pilot symbols used by a propagation path estimating unit, and a number of pilot symbols despread by the despreading unit. Thereby, when the demodulating method is other than 64-QAM, the sampling rate and the like adjusted to QPSK or 16-QAM can be set.

6 Claims, 13 Drawing Sheets

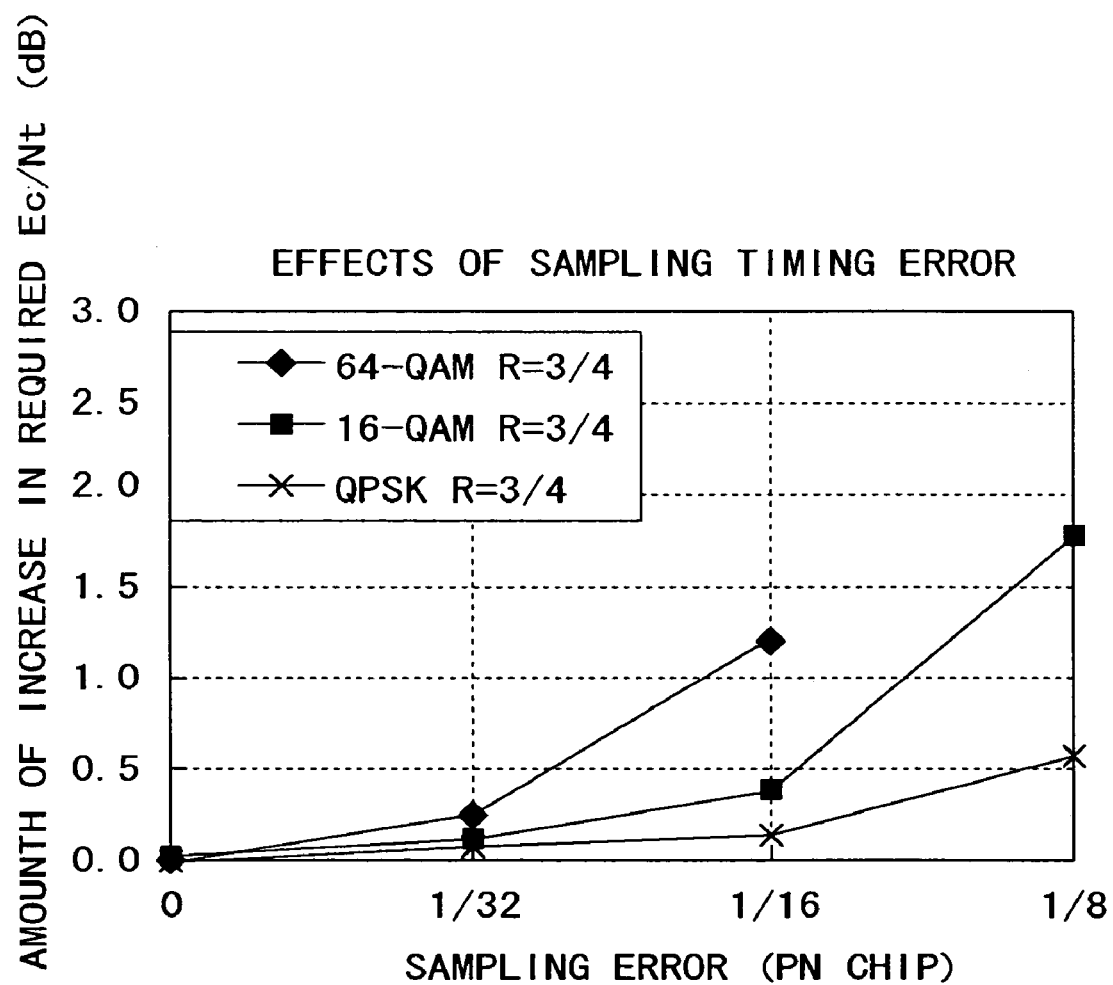
F I G. 1

1, 1, 1, 0, 0, 1, 0, 0, 0, 1, 1, 1, 0

1, 1, 1, 0, 0, 1, 0, 0, 0, 1, 1, 1, 0

1, 1, 1, 0, 0, 1, 0, 0, 0, 1, 1, 1, 0

SPREAD SPECTRUM COMMUNICATION SYSTEM APPARATUS

TECHNICAL FIELD

The present invention relates to a spread spectrum communication system apparatus that controls receiver parameters of A/D conversion speed, a propagation path estimating method and the like.

BACKGROUND ART

An adaptive modulation and coding rate communication system conventionally used changes a cording rate of error correction code and a degree of multi-value modulation according to propagation path quality. Specifically, this system provides high-speed data communication for a user with a good propagation path quality while sacrificing noise-resisting characteristics, and provides low-speed data communication for a user with a poor propagation path quality, attaching importance to noise-resisting characteristics.

The communication system using such an adaptive modulation is used in radio communication systems such as GSM EDGE, HDR and the like. Also, a similar system is expected to be used additionally in W-CDMA.

An example of the adaptive modulation and coding rate communication system will be described with reference to Table 1 below.

TABLE 1

| Mode | Coding method | Modulating method |
|------|---------------|-------------------|
| 0 | R = 1/2 | QPSK |
| 1 | R = 1/2 | 16-QAM |
| 2 | R = 3/4 | 16-QAM |
| 3 | R = 3/4 | 64-QAM |

First, reception quality data indicating quality of received data is transmitted from a receiver to a base station. At the base station, the reception quality data is classified into four grades (modes 0 to 3). The mode 0 indicates the lowest quality, and the mode 3 indicates the highest quality. The base station selects a coding method and a modulating method as shown in Table 1 on the basis of the mode of the reception quality data.

Table 1 shows two coding methods represented by R=1/2 and R=3/4. The coding method represented by R=1/2 adds one redundant bit to one bit of input data. The coding method represented by R=3/4 adds one redundant bit to three bits of input data. Modulating methods include known QPSK, 16-QAM, and 64-QAM.

A relation of amounts of data transferred is expressed as follows:

$(R=1/2, QPSK) < (R=1/2, 16\text{-}QAM) < (R=3/4, 16\text{-}QAM) < (R=3/4, 64\text{-}QAM)$ On the other hand, a relation of noise resisting characteristics is expressed as follows:

$(R=1/2, QPSK) > (R=1/2, 16\text{-}QAM) > (R=3/4, 16\text{-}QAM) > (R=3/4, 64QAM)$ Thus, the amounts of data transferred and the noise resisting characteristics have relations opposite to each other.

Hence, when a coding method and a modulating method are selected as shown in Table 1, the mode 0, indicating the lowest quality, allows communications with enhanced noise resisting characteristics. The mode 3, indicating the highest quality, allows communications transferring a large amount of data.

With the conventional technology as described above, reception quality data is transmitted from a receiver to a base station, and the base station selects a combination of an optimum modulating method and coding method on the basis of the reception quality data. Thus, the receiver is required to maintain good reception characteristics in all combinations of the modulating methods and coding methods handled by the base station.

A comparison of the modulating methods QPSK, 16-QAM, and 64-QAM indicates that 64-QAM is more susceptible to a shift in reception timing, an error in synchronous detection and the like, as compared with the other methods. FIG. 1 is a graph showing a comparison of effects of shifts in reception timing on the modulating methods. As shown in FIG. 1, 64-QAM is most susceptible to shifts in reception timing. FIG. 2 is a graph showing a comparison of effects of errors in synchronous detection on the modulating methods. As shown in FIG. 2, 64-QAM is most susceptible to shifts in reception timing.

64-QAM and 16-QAM are susceptible to multipath interference specific to a mobile communication environment. Accordingly, when 64-QAM or 16-QAM is used, it is necessary, for efficient communication, to suppress the interference by using an interference canceller and an equalizer.

Thus, a high-performance receiver compatible with the adaptive modulation and coding rate communication system needs to be designed in accordance with the mode (64-QAM in this case) in which accuracy of each receiving function is most likely to deteriorate due to a shift in reception timing and the like.

Such high performance, however, is not necessary at the time of reception in a mode in which accuracy of the receiving function does not deteriorate.

Also, highly accurate reception processing generally requires an increase in speed of signal processing, and thus increases power consumption. A mobile terminal such as a portable telephone, of which low power consumption is required, needs to perform only a minimum function required for reception. Hence, there is a problem with operation at all times of a functional block designed for the 64-QAM mode.

It is accordingly an object of the present invention to provide a communication apparatus and the like that eliminate the need for performing at all times the function provided for the mode in which reception accuracy tends to deteriorate in the adaptive modulation communication.

DISCLOSURE OF INVENTION

The present invention relates to a despreading device. The despreading device according to the present invention receives a spread signal to be received. The despreading device according to the present invention includes receiving means, despreading means, sampling rate supplying means, and control means.

The receiving means receives a signal to be received that has a control signal specifying a demodulating method. The despreading means despreads the received signal on the basis of a sampling rate, and then outputs the control signal. The sampling rate supplying means supplies the sampling rate to the despreading means. The control means controls the sampling rate on the basis of the control signal.

According to the invention comprised as described above, the control means controls the sampling rate of the despreading means on the basis of the control signal specifying the demodulating method. Thereby the sampling rate can be set lower as appropriate according to the demodulating method, and a function (high sampling rate) provided for a demodulating method that is most susceptible to deterioration in accuracy may not be performed at all times.

The present invention also relates to a propagation path estimating device. The propagation path estimating device according to the present invention receives a spread signal to be received. The propagation path estimating device according to the present invention includes receiving means, despreading means, propagation path estimating means, and control means.

The receiving means receives a signal to be received that has a pilot signal and a control signal specifying a demodulating method. The despreading means despreads the received signal, and then outputs the pilot signal and the control signal. The propagation path estimating means obtains an amount of phase rotation of the received signal on the basis of the pilot signal. The control means controls length of the pilot signal used by the propagation path estimating means on the basis of the control signal.

According to the invention comprised as described above, the control means controls the length of the pilot signal used by the propagation path estimating means on the basis of the control signal specifying the demodulating method. Thereby the length of the pilot signal used by the propagation path estimating means can be increased as appropriate according to the demodulating method, and a function (a function of reducing the length of the pilot signal used) provided for a demodulating method that is most susceptible to deterioration in accuracy may not be performed at all times.

Further, the present invention relates to a despreading device. The despreading device according to the present invention receives a spread signal to be received. The despreading device according to the present invention includes receiving means, despreading means, and control means.

The receiving means receives a signal to be received that has a pilot signal and a control signal specifying a demodulating method. The despreading means despreads the received signal, and then outputs the pilot signal and the control signal. The control means controls length of the pilot signal despread by the despreading means on the basis of the control signal.

According to the invention comprised as described above, the control means controls the length of the pilot signal despread on the basis of the control signal specifying the demodulating method. Thereby the length of the pilot signal despread can be increased as appropriate according to the demodulating method, and a function (a function of reducing the length of the pilot signal despread) provided for a demodulating method that is most susceptible to deterioration in accuracy may not be performed at all times.

BRIEF DESCRIPTION OF THE DRAWINGS

FIG. 1 is a graph showing a comparison of modulating methods (QPSK, 16-QAM, and 64QAM) and effects of shifts in reception timing.

BEST MODE FOR CARRYING OUT THE INVENTION

Prior to description of an embodiment of the present invention, an adaptive modulation communication system on which the embodiment of the present invention is predicated will be described.

Figure 2:
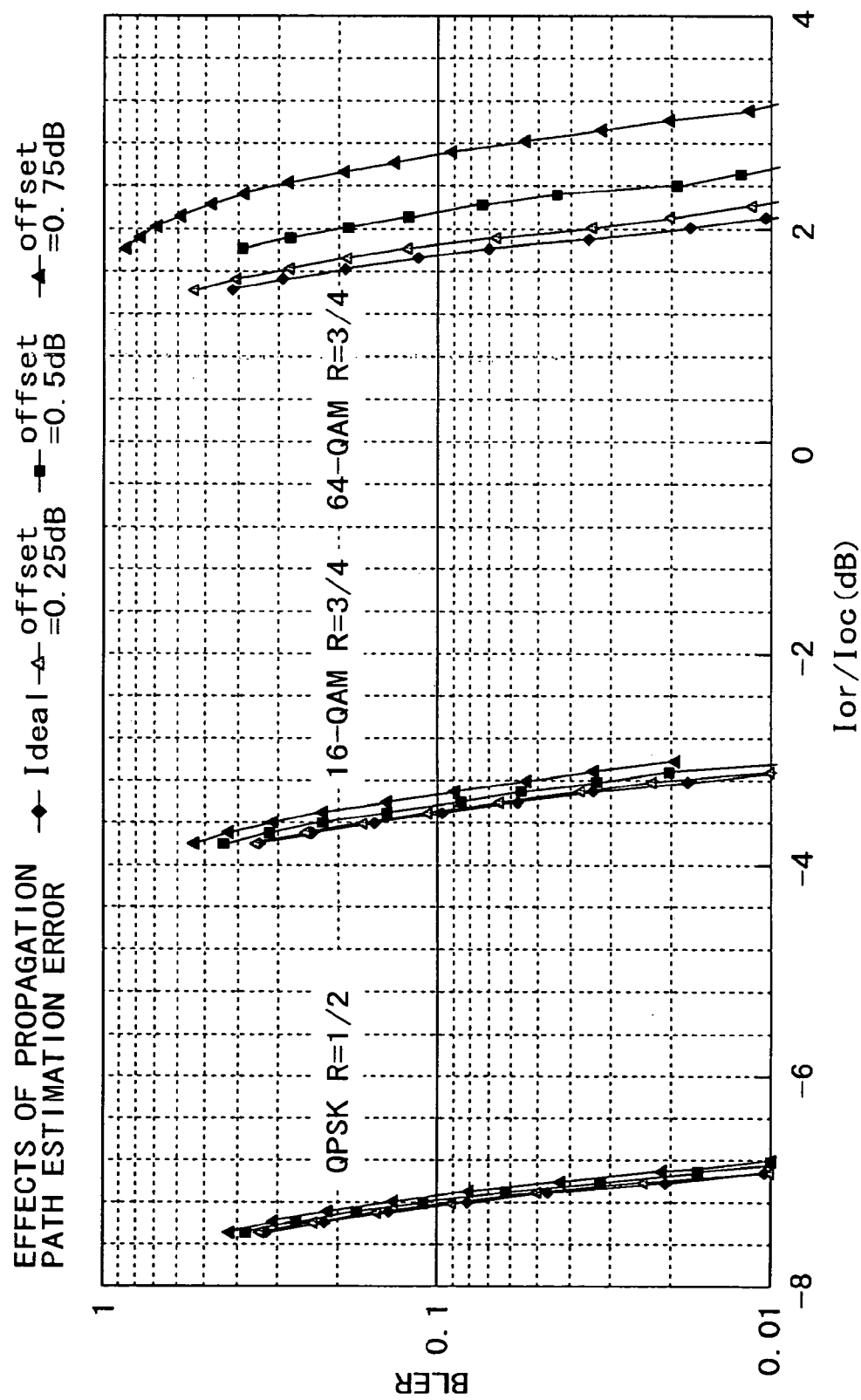
FIG. 2 is a graph showing a comparison of modulating methods (QPSK, 16-QAM, and 64QAM) and effects of errors in synchronous detection.
Figure 3:
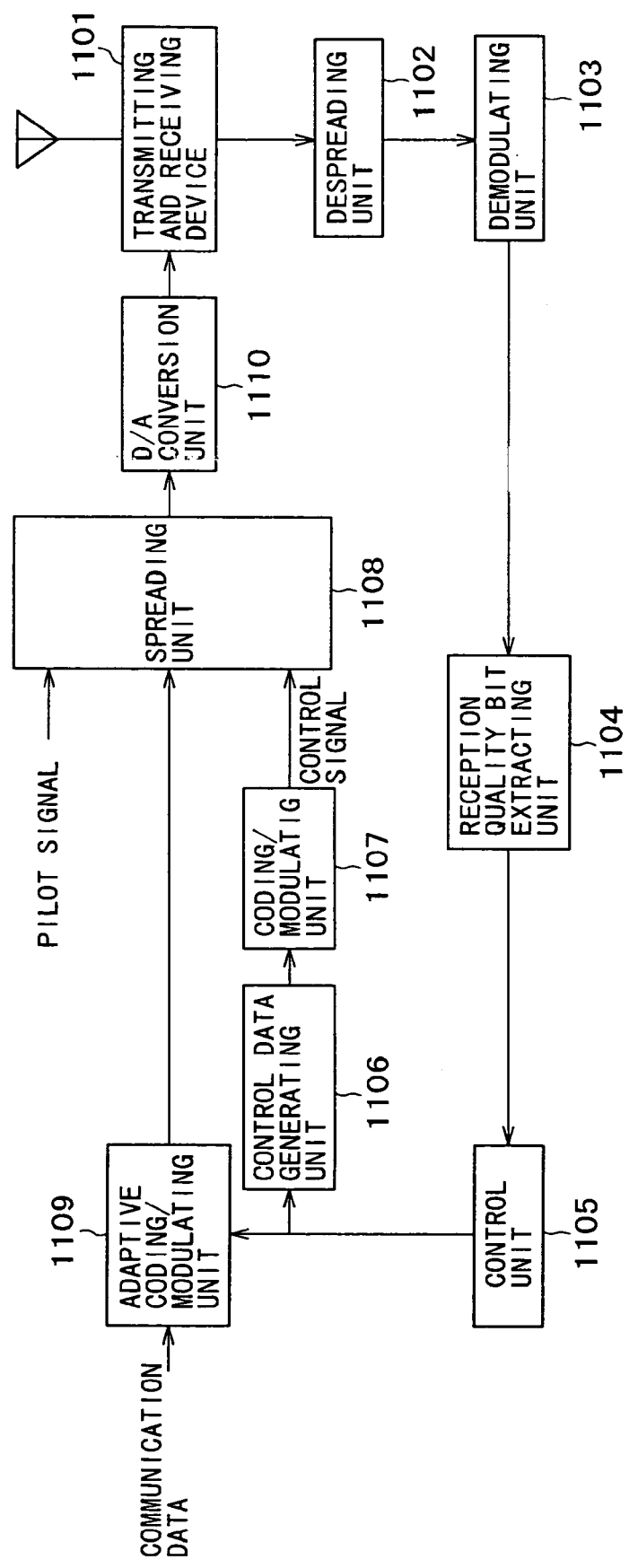
FIG. 3 is a block diagram showing a configuration of a base station in an adaptive modulation communication system.

FIG. 3 is a block diagram showing a configuration of a base station in the adaptive modulation communication system. The base station includes a transmitting and receiving device 1101, a despreading unit 1102, a demodulating unit 1103, a reception quality bit extracting unit 1104, a control unit 1105, a control data generating unit 1106, a coding/modulating unit 1107, a spreading unit 1108, an adaptive coding/modulating unit 1109, and a D/A conversion unit 1110.

The transmitting and receiving device 1101 receives a reception quality data signal transmitted from a user terminal, which will be described late. The reception quality data signal indicates quality of a signal received by the user terminal from the base station. The reception quality data signal is spread and modulated by the user terminal. Also, the transmitting and receiving device 1101 transmits a signal outputted by the D/A conversion unit 1110 to the user terminal.

The despreading unit 1102 despreads and outputs the reception quality data signal. The demodulating unit 1103 demodulates and outputs the output of the despreading unit 1102. Thereby, the reception quality data signal in a state before being spread and modulated is generated. The reception quality bit extracting unit 1104 extracts from the reception quality data signal information of the quality of the signal received by the user terminal from the base station (referred to as reception quality data).

According to the extracted reception quality data, the control unit 1105 determines a coding method for coding and a modulating method for modulating communication data, a control signal, and a pilot signal to be sent to the user terminal.

In this case, for simple description, the coding method and the modulating method are selected from four combinations shown in Table 2.

TABLE 2

| Mode | Coding method | Modulating method |
|---|---|---|
| 0 | R = 1/2 | QPSK |
| 1 | R = 1/2 | 16-QAM |
| 2 | R = 3/4 | 16-QAM |
| 3 | R = 3/4 | 64-QAM |

Table 2 shows two coding methods represented by R=1/2 and R=3/4. The coding method represented by R=1/2 adds one redundant bit to one bit of input data. The coding unit represented by R=3/4 adds one redundant bit to three bits of input data.

Code of R=1/2 has a larger number of redundant bits, thus resulting in a high error correction capability, but reduces transmissible communication data. On the other hand, the code error correction capability of R=3/4 is lower than that of R=1/2, but transmissible communication data is increased.

Figure 4A:
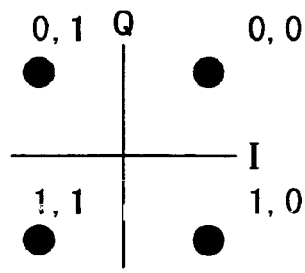
FIGS. 4A, 4B, and 4C are diagrams showing symbol maps of the modulating methods (QPSK, 16-QAM, and 64-QAM), and show a symbol map of QPSK (FIG. 4A), a symbol map of 16-QAM (FIG. 4B), and a symbol map of 64-QAM (FIG. 4C).
Figure 4B:
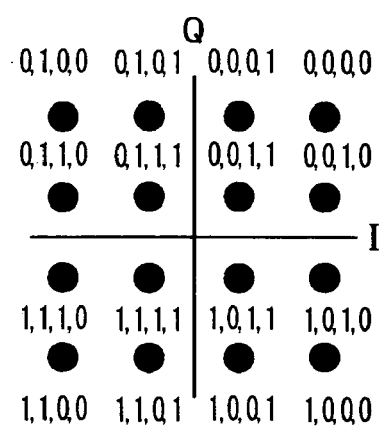
Figure 4C:
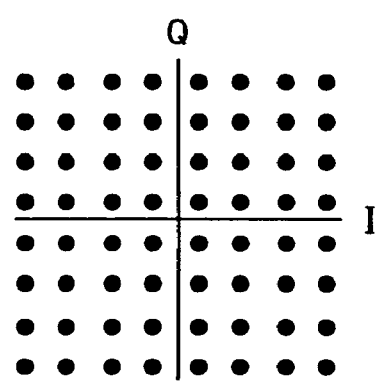

QPSK, 16-QAM, and 64-QAM is used as the modulating method. FIGS. 4A, 4B, and 4C show symbol maps of these modulating methods. As shown in FIG. 4A, the QPSK modulation maps coded 2-bit data into one symbol. As shown in FIG. 4B, 16-QAM maps 4-bit data into one symbol. As shown in FIG. 4C, 64-QAM maps 6-bit data into one symbol.

Referring to FIGS. 4A to 4C, when a transmissible symbol rate is fixed, an amount of transmissible data is maximum for 64 QAM, which maps the maximum number of bits into one symbol, and is minimum for QPSK. On the other hand, 64 QAM is easily affected by noise because of short distance between adjacent symbols, and QPSK has the most favorable error characteristics at the same noise level.

Thus, a relation of the amounts of data transferred is expressed as follows:

$$(R=1/2, QPSK) < (R=1/2, 16\text{-}QAM) < (R=3/4, 16\text{-}QAM) < (R=3/4, 64QAM)$$

On the other hand, a relation of noise resisting characteristics is expressed as follows:

$$(R=1/2, QPSK) > (R=1/2, 16\text{-}QAM) > (R=3/4, 16\text{-}QAM) > (R=3/4, 64QAM)$$

In a case of a good propagation path with a low noise (a case of good reception quality), the control unit 1105 selects a coding/modulating combination allowing transfer of a large amount of data. In a case of a poor propagation path with a high noise (a case of poor reception quality), the control unit 1105 reduces the amount of data transferred, and selects a coding/modulating combination for improving noise resisting characteristics.

The control data generating unit 1106 generates a control signal for communicating the coding/modulating method selected by the control unit 1105 to the user terminal. The coding/modulating unit 1107 subjects an output of the control data generating unit 1106 to coding/modulating processing by a predetermined method. The coding/modulating unit 1107 generally performs QPSK modulation.

The spreading unit 1108 spreads a pilot signal, communication data outputted from the adaptive coding/modulating unit 1109, and the control signal outputted from the coding/modulating unit 1107 by using different spreading codes.

Figure 5:
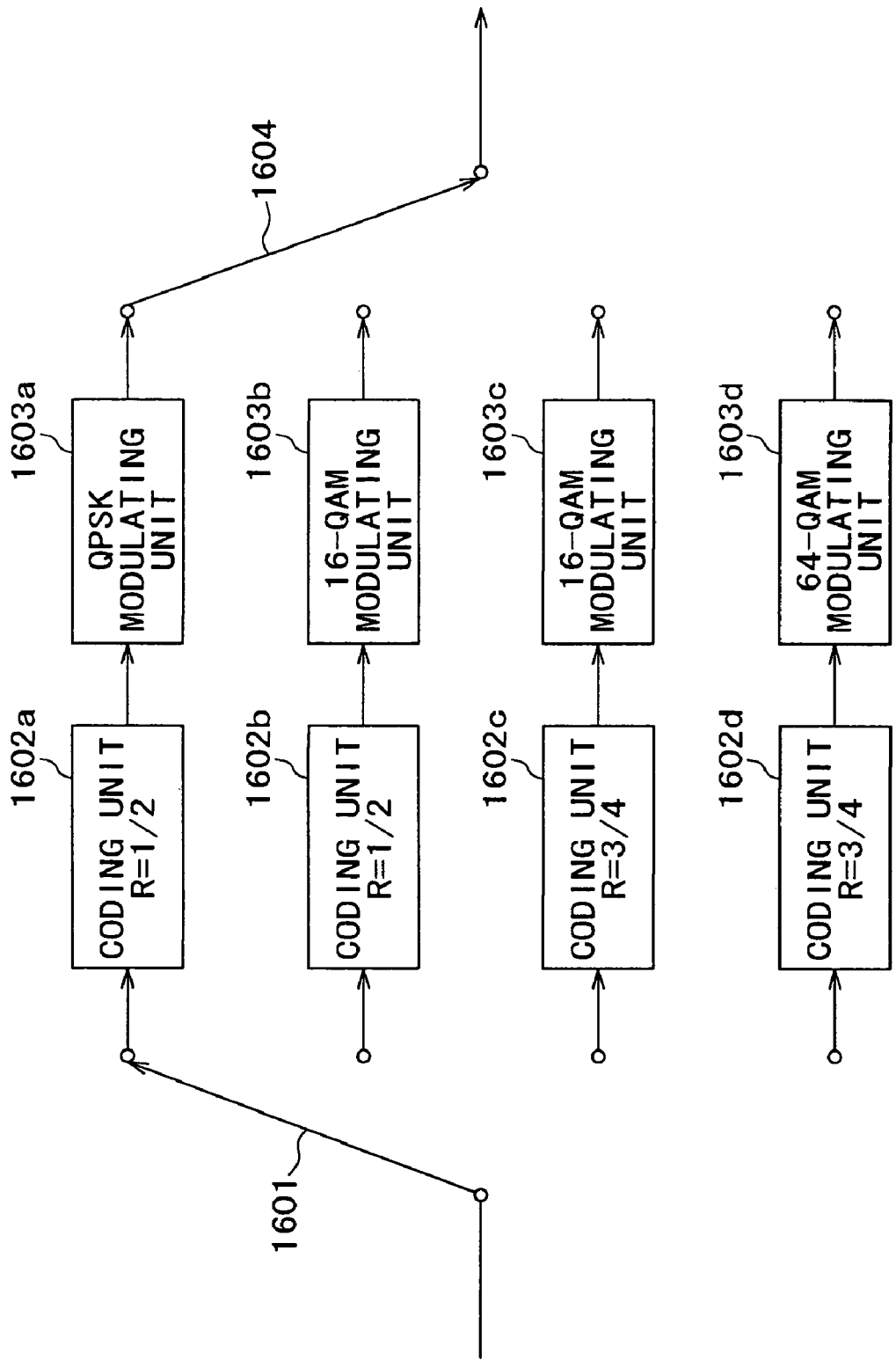
FIG. 5 is a block diagram showing details of a configuration of an adaptive coding/modulating unit 1109.

The adaptive coding/modulating unit 1109 subjects communication data (for example packet data) to coding/modulating processing by the coding method and the modulating method selected by the control unit 1105. FIG. 5 shows details of a configuration of the adaptive coding/modulating unit 1109. The adaptive coding/modulating unit 1109 has switches 1601 and 1604, coding units 1602a to 1602d, and modulating units 1603a to 1603d. The switches 1601 and 1604 are operated to select either one of a plurality of series circuits (1602a-1603a, 1602b-1603b, 1602c-1603c, and 1602d-1603d) formed by the coding units 1602a to 1602d on an input side and the modulating units 1603a to 1603d on an output side according to the coding method and the modulating method selected by the control unit 1105. The coding units 1602a to 1602d add error correction code to a signal inputted thereto, that is, code the signal inputted thereto, and then output the coded signal. The modulating units 1603a to 1603d subject the signal coded by the coding units 1602a to 1602d to modulation symbol mapping, that is, modulate the signal, and then output the modulated signal.

The D/A conversion unit 1110 converts a digital signal outputted by the spreading unit 1108 into an analog signal, and then outputs the analog signal to the transmitting and receiving device 1101.

Figure 6:
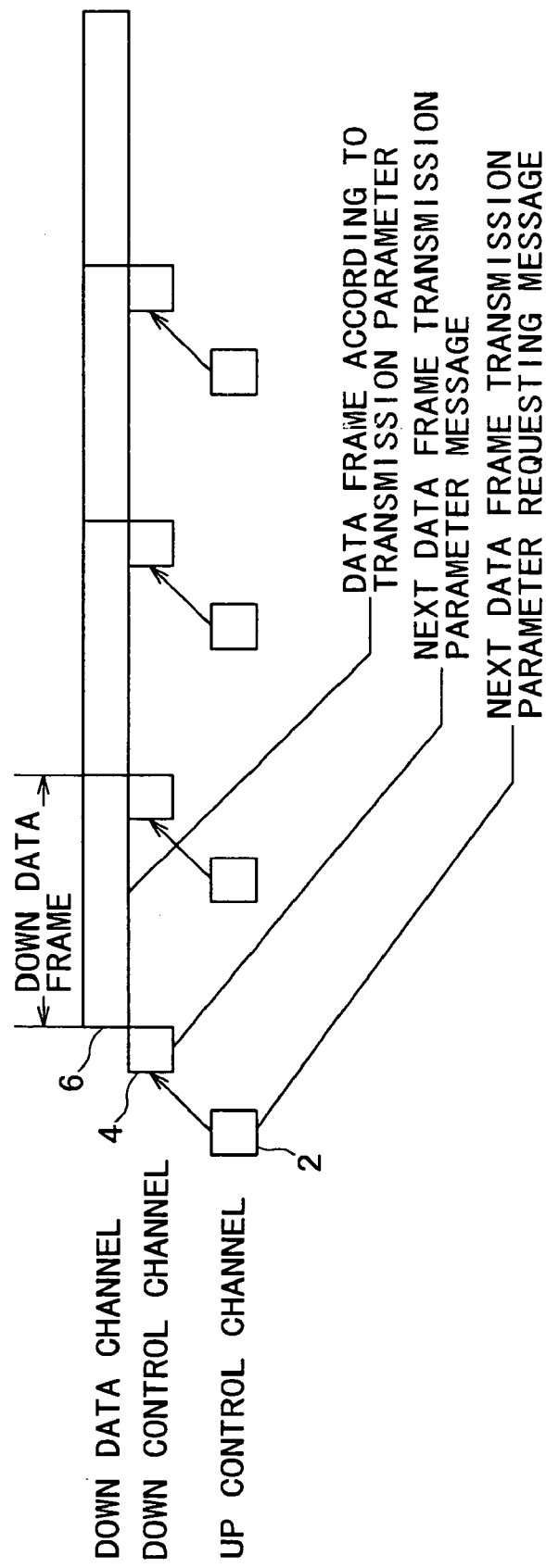
FIG. 6 is a diagram showing contents of signals transmitted and received by the base station to and from a user terminal via a transmitting and receiving device 1101.

FIG. 6 shows contents of signals transmitted and received by the base station to and from the user terminal via the transmitting and receiving device 1101. The transmitting and receiving device 1101 receives a reception quality data signal 2 sent from the user terminal in an up control channel, and transmits a control signal 4 to the user terminal in a down control channel. As described above, the control signal is determined on the basis of the reception quality data signal 2. The transmitting and receiving device 1101 further transmits communication data 6 to the user terminal in a down data channel immediately after transmitting the control signal.

An embodiment of the present invention relates to the user terminal. The embodiment of the present invention will hereinafter be described with reference to drawings.

Figure 7:
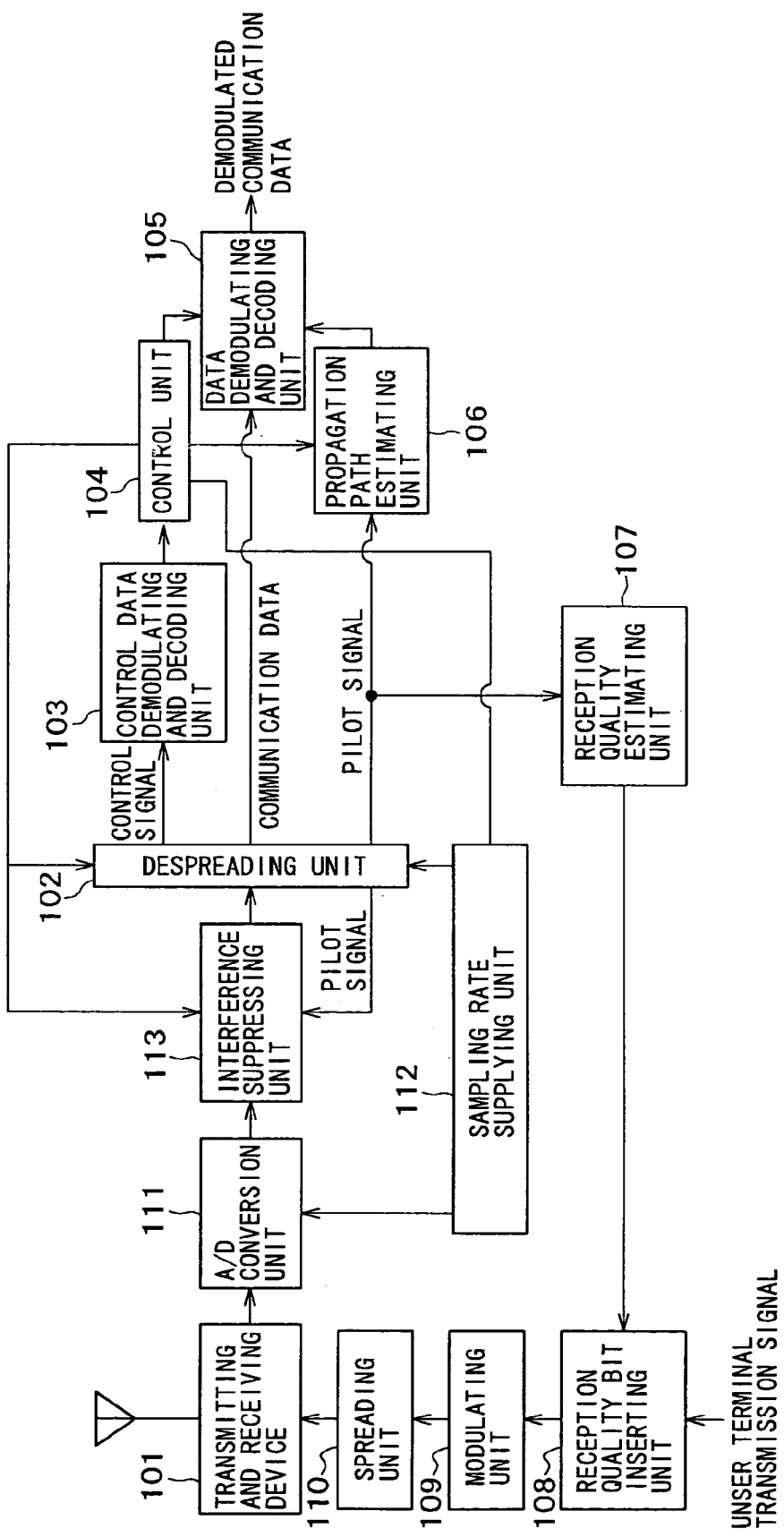
FIG. 7 is a block diagram showing a configuration of a user terminal (receiving apparatus) according to an embodiment of the present invention.

FIG. 7 is a block diagram showing a configuration of a user terminal (receiving apparatus) according to an embodiment of the present invention. The user terminal includes a transmitting and receiving device 101, an A/D conversion unit 111, a despreading unit 102, a control data demodulating and decoding unit 103, a control unit 104, a data demodulating and decoding unit 105, a propagation path estimating unit 106, a reception quality estimating unit 107, a reception quality bit inserting unit 108, a modulating unit 109, a spreading unit 110, a sampling rate supplying unit 112, and an interference suppressing unit 113.

The transmitting and receiving device 101 receives a signal transmitted from the base station (see FIG. 3). The signal received will be referred to as a received signal. The received signal has communication data, a pilot signal, and a control signal, and is spread and modulated in the base station. The control signal specifies a modulating method, that is, a demodulating method. For example, when the control signal indicates that the received signal is modulated by QPSK in the base station, the demodulating method needs to be QPSK. That is, the control signal specifies QPSK as the demodulating method. The control signal also specifies a decoding method. Also, the transmitting and receiving device 101 transmits a reception quality data signal outputted by the spreading unit 110 to the base station.

The A/D conversion unit 111 and the despreading unit 102 include despreading means for despreading the received signal and then outputting communication data, a pilot signal, and a control signal. Alternatively, only the despreading unit 102 may be considered to be the despreading means. In this case, the transmitting and receiving device 101 and the A/D conversion unit 111 form receiving means. The A/D conversion unit 111 converts the received signal into a digital signal. The despreading unit 102 despreads the digitized received signal, and then outputs communication data, a pilot signal, and a control signal.

The interference suppressing unit 113 suppresses multipath interference in an output of the A/D conversion unit 111. The suppression of multipath interference specific to a mobile communication environment uses an interference canceller shown in Higuchi et al. "Characteristics of Ultrahigh Speed Packet Transmission Using Multipath Interference Canceller in W-CDMA Downlink" (Technical Report of the Institute of Electronics, Information and Communication Engineers, RCS2000-134, October 2000) or the like, and an equalizer shown in Hooli et al. "Multiple Access Interference Suppression with Linear Chip Equalizers in WCDMA Downlink Receivers", Proc. Global Telecommunications Conf. Pp. 467-471. November 1999 or the like. For example, the pilot signal output of the despreading unit 102 is inputted to the interference suppressing unit 113, propagation path characteristics are estimated from a pilot component, and then the propagation path characteristics are equalized adaptively.

Processing by the interference suppressing unit 113 is performed at a sampling rate. The processing therefore requires very high speed arithmetic processing and consumes much power. Hence, it is not desirable for the interference suppressing unit 113 to suppress multipath interference at all times. On the other hand, when the modulating method is 64-QAM or 16-QAM, susceptibility to multipath interference is increased as compared with the modulating method of QPSK. Thus, the control unit 104 reads the demodulating method, and sends the information to the interference suppressing unit 113. When the demodulating method is 64-QAM or 16-QAM, the interference suppressing unit 113 suppresses multipath interference, and when the demodulating method is QPSK, the interference suppressing unit 113 does not suppress multipath interference.

The control data demodulating and decoding unit 103 demodulates and decodes the control signal by a predetermined method. For example, when QPSK modulation of the control signal is predetermined, the control signal is demodulated by the QPSK method.

The control unit 104 reads the specified demodulating method and decoding method from the control signal outputted from the control data demodulating and decoding unit 103. On the basis of the specified demodulating method, the control unit 104 controls the A/D conversion unit 111, the despreading unit 102, the data demodulating and decoding unit 105, the propagation path estimating unit 106, the sampling rate supplying unit 112, and the interference suppressing unit 113. Details of the control will be described in conjunction with description of the data demodulating and decoding unit 105, the propagation path estimating unit 106, and the sampling rate supplying unit 112. The control of the interference suppressing unit 113 is as described above.

The data demodulating and decoding unit 105 demodulates and decodes the communication data outputted from the despreading unit 102. The demodulating method and the decoding method are specified in the control signal, and sent from the control unit 104.

Figure 8:
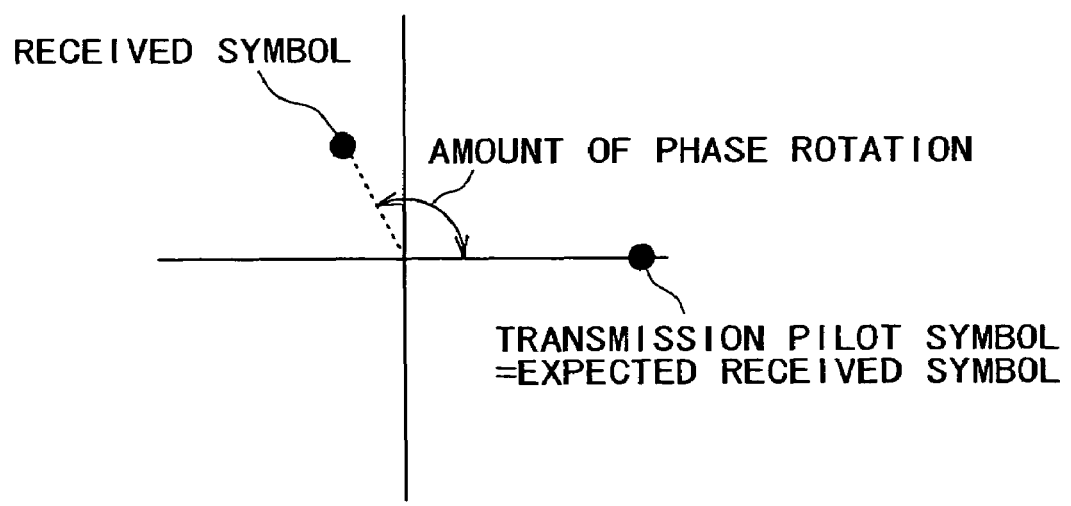
FIG. 8 is a diagram showing an amount of phase rotation.

The propagation path estimating unit 106 obtains an amount of phase rotation on the basis of the pilot signal outputted from the despreading unit 102. As shown in FIG. 8, the amount of phase rotation is a phase difference between the received signal and an expected received signal. The amount of phase rotation is obtained after averaging M pilot symbols, in consideration of effects of a noise component added on a pilot channel. The number of pilot symbols used, that is, length of the pilot signal used is determined on the basis of the demodulating method specified in the control signal. The demodulating method is sent from the control unit 104.

Since the amount of noise added to the pilot symbols varies depending on propagation path characteristics, it is effective to change the length of the pilot signal (number of pilot symbols) according to the propagation path characteristics. Specifically, when there is a large amount of noise, it is desirable to increase the length of the pilot signal used in obtaining an average and thereby reduce effects of the noise. When there is a small amount of noise, it is desirable to decrease the length of the pilot signal used in obtaining an average and thereby obtain data (amount of phase rotation) in as short a time as possible.

Figure 9:
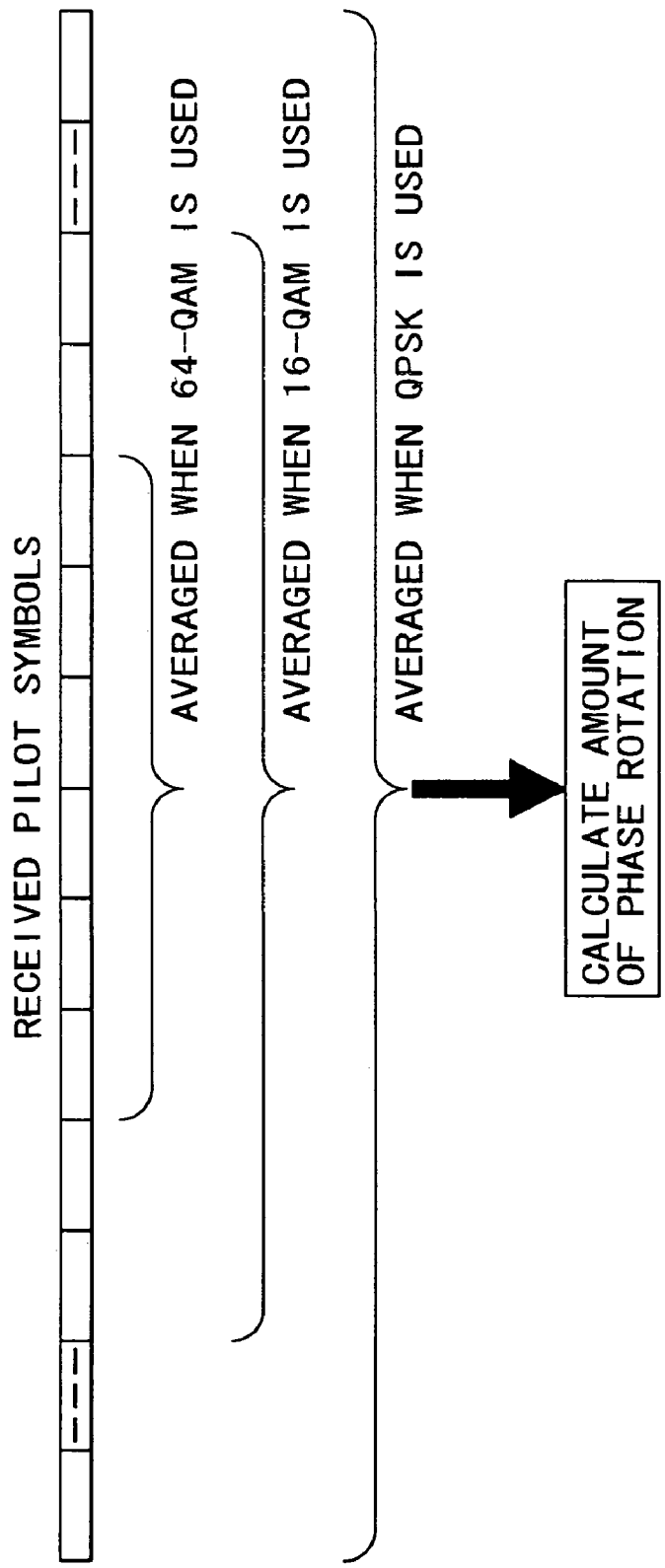
FIG. 9 is a diagram showing lengths of a pilot signal used in obtaining an average.

When there is a large amount of noise, the demodulating method specified in the control signal is QPSK. Thus, when the demodulating method sent from the control unit 104 is QPSK, the propagation path estimating unit 106 increases the length of the pilot signal used in obtaining an average. When there is a small amount of noise, the demodulating method specified in the control signal is 64 QAM. Thus, when the demodulating method sent from the control unit 104 is 64 QAM, the propagation path estimating unit 106 decreases the length of the pilot signal used in obtaining an average. The thus set length of the pilot signal used in obtaining an average is shown in FIG. 9. The length of the pilot signal is shortest (six pilot symbols) in the demodulating method of 64 QAM, while the length of the pilot signal is longest (20 pilot symbols) in the demodulating method of QPSK. The length of the pilot signal is intermediate (10 pilot symbols) in the demodulating method of 16-QAM.

The control of the length of the pilot signal has been described supposing that the control unit 104 controls the propagation path estimating unit 106. However, the control unit 104 can also control the length of the pilot signal despread by the despreading unit 102. The length of the pilot signal despread in 64 QAM is shortest, while the length of the pilot signal despread in the demodulating method of QPSK is longest. The length of the pilot signal despread is intermediate in the demodulating method of 16-QAM.

The reception quality estimating unit 107 estimates a signal-to-noise ratio of the down data channel. The signal-to-noise ratio to be estimated is calculated as follows, by obtaining a signal-to-noise ratio of a pilot channel symbol code-multiplexed and transmitted in parallel with the down data channel, and taking into consideration a difference between pilot channel power and data channel power.

The reception quality bit inserting unit 108 inserts the estimated reception quality value (Data_SNR) into a user terminal transmission signal to be transmitted to the base station by the user terminal, and then outputs the result as a reception quality data signal. The modulating unit 109 modulates and outputs the reception quality data signal. The spreading unit 110 spreads the modulated reception quality data signal, and then outputs the spread reception quality data signal to the transmitting and receiving device 101.

The sampling rate supplying unit 112 supplies a sampling rate of the despreading unit 102 and the A/D conversion unit 111. The sampling rate is determined on the basis of the demodulating method specified in the control signal. The demodulating method is sent from the control unit 104.

The A/D conversion unit 111 converts the analog received signal into a digital signal. For fine synchronous processing in a baseband unit, the A/D conversion is performed by oversampling over a spread chip rate. In processing a wideband received signal such as of W-CDMA, while high-speed A/D conversion is required, it is important, for reduction in power consumption, to select the lowest oversampling rate that can maintain reception characteristics. In W-CDMA using the QPSK modulation, four- or eight-times oversampling is generally appropriate. The 16-QAM modulation requires a higher sampling rate. The 64-QAM modulation requires a still higher sampling rate than the 16-QAM modulation.

Thus, when the demodulating method sent from the control unit 104 is the QPSK modulation, the sampling rate supplying unit 112 supplies a sampling rate four times the chip rate. When the demodulating method sent from the control unit 104 is the 16-QAM modulation, the sampling rate supplying unit 112 supplies a sampling rate eight times the chip rate. When the demodulating method sent from the control unit 104 is the 64 QAM modulation, the sampling rate supplying unit 112 supplies a sampling rate 16 times the chip rate.

Thus, the sampling rate supplying unit 112 supplies the sampling rate 16 times the chip rate only in the case of the 64-QAM modulation. In the cases of the other modulating methods, the sampling rate supplying unit 112 supplies the lower sampling rates.

Figure 10A:
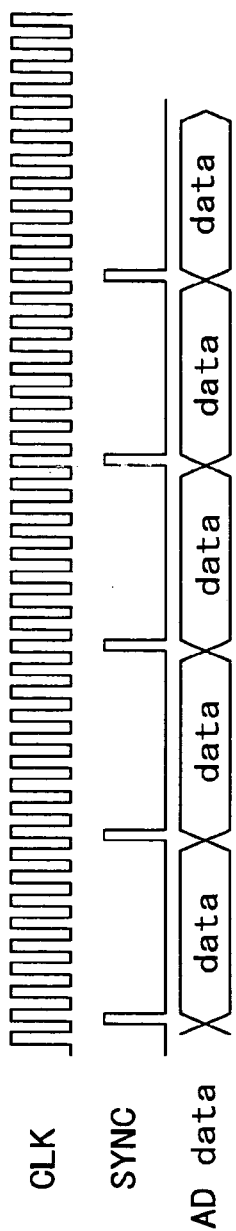
FIGS. 10A, 10B, and 10C are time charts when a cycle of a SYNC pulse for data trigger timing is changed, and show a state of 64-QAM data transfer (FIG. 10A), a state of 16-QAM transfer (FIG. 10B), and a state of QPSK transfer (FIG. 10C).
Figure 10B:
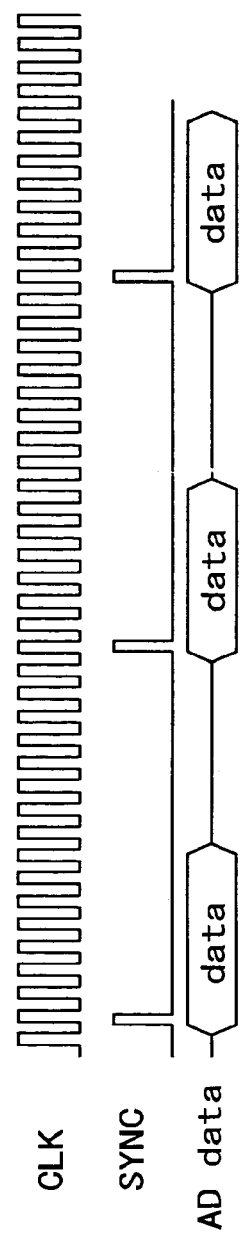
Figure 10C:
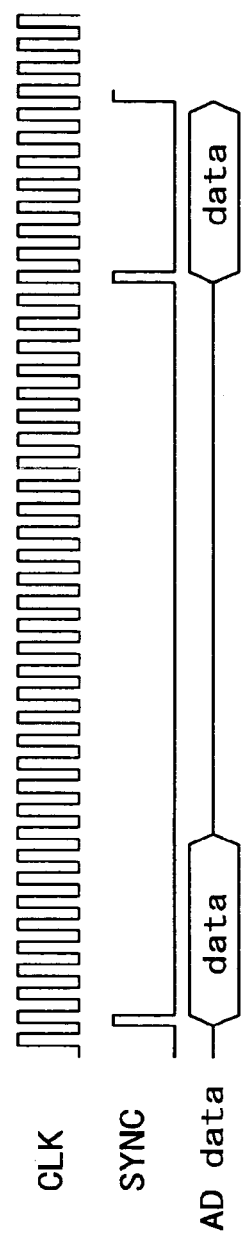

The sampling rate supplying unit 112 can supply the sampling rate by changing a cycle of a SYNC pulse for data trigger timing, as shown in FIGS. 10A, 10B, and 10C. FIG. 10A shows a state of 64 QAM data transfer; FIG. 10B shows a state of 16-QAM transfer; and FIG. 10C shows a state of QPSK transfer.

Figure 11A:
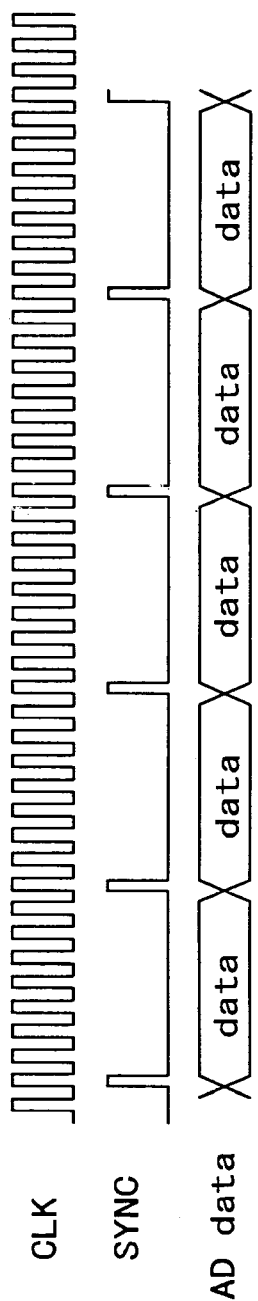
FIGS. 11A, 11B, and 11C are time charts when a data transfer clock speed is changed, and show a state of 64-QAM data transfer (FIG. 11A), a state of 16-QAM transfer (FIG. 11B), and a state of QPSK transfer (FIG. 11C).
Figure 11B:
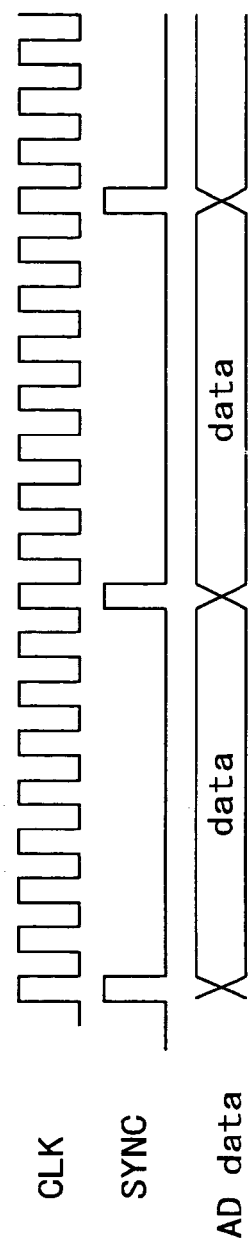
Figure 11C:
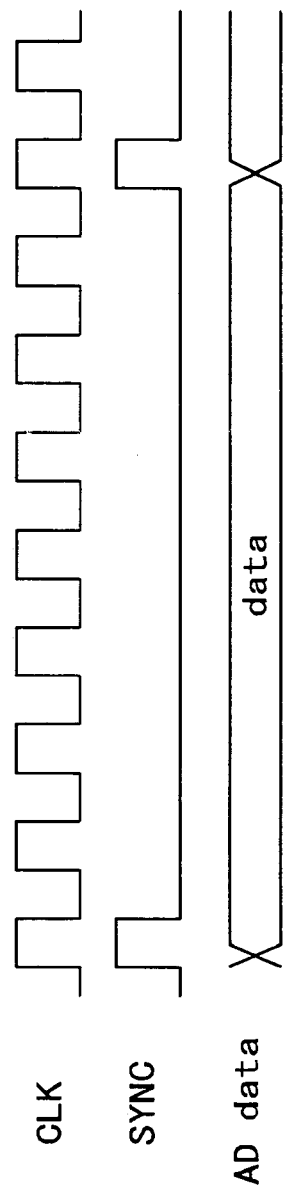

In addition, as shown in FIGS. 11A, 11B, and 11C, the sampling rate supplying unit 112 can supply the sampling rate by changing a data transfer clock speed. FIG. 11A shows a state of 64 QAM data transfer; FIG. 11B shows a state of 16-QAM transfer; and FIG. 11C shows a state of QPSK transfer.

Operation of the embodiment of the present invention will next be described with reference to a flowchart of FIG. 12.

First the transmitting and receiving device 101 receives a control signal (S10). The received control signal is digitized by the A/D conversion unit 111, despread by the despreading unit 102, and demodulated and decoded by the control data demodulating and decoding unit 103. Incidentally, it is supposed that the control signal is set to be subjected to the QPSK modulation in the base station. Thus, the sampling rate is set to be the minimum value, or four times the chip rate. Also, the demodulating method is the QPSK method. Further, the length of a pilot signal (number of pilot symbols) used in obtaining an average or the length of the pilot signal despread is set to the maximum length of 20 symbols.

The control unit 104 reads a specified demodulating method and decoding method from the control signal outputted from the control data demodulating and decoding unit 103 (S12). Then the control unit 104 determines whether or not communication data is received (S14). When no communication data is received (S14, No), the processing returns to the reception of a control signal (S10). When communication data is received (S14, Yes), the control unit 104 determines the sampling rate of the A/D conversion unit 111 and the like and the length of the pilot signal (number of pilot symbols) used in obtaining an average.

When the demodulating method specified in the control signal is QPSK (S16, Yes), the sampling rate and the length of the pilot signal used in obtaining an average (referred to as pilot averaging length) are not changed. That is, the control unit 104 controls the sampling rate supplying unit 112 to set the sampling rate to the minimum value, or four times the chip rate. Also, the control unit 104 controls the propagation path estimating unit 106 to set the pilot averaging length to the maximum length of 20 symbols. Incidentally, the control unit 104 may control the despreading unit 102 to set the length (number of pilot symbols) of the pilot signal despread to the maximum length of 20 symbols. The control unit 104 controls the interference suppressing unit 113 to leave suppression of multipath interference stopped.

The demodulating method of QPSK means that processing may be at low speed, and hence that the sampling rate may be low. Since it is expected that much noise is added, however, the pilot averaging length needs to be increased to suppress the noise. Accordingly, the sampling rate is set to the minimum value, and the pilot averaging length is set to the maximum value. When the demodulating method is QPSK, susceptibility to multipath interference is less, and therefore the multipath interference interferes less with communications without being suppressed. Thus, the multipath interference is not suppressed, whereby power consumption is reduced.

When the demodulating method specified in the control signal is 16-QAM (S16, No, and S20, Yes), the control unit 104 controls the sampling rate supplying unit 112 to set the sampling rate to the intermediate value of eight times the chip rate (S22). Also, the control unit 104 controls the propagation path estimating unit 106 to set the pilot averaging length to the intermediate length of 10 symbols (S24). Incidentally, the control unit 104 may control the despreading unit 102 to set the length (number of pilot symbols) of the pilot signal despread to the intermediate length of 10 symbols. The control unit 104 then controls the interference suppressing unit 113 to suppress multipath interference (S26).

The demodulating method of 16-QAM means that processing is at medium speed, and hence that a medium sampling rate is required. Since it is expected that a medium level of noise is added, on the other hand, it is desirable that the pilot averaging length be set intermediate for both the suppression of the noise and the instantaneous measurement of an amount of phase rotation. Accordingly, the sampling rate is set to the intermediate value, and the pilot averaging length is set to the intermediate value. When the demodulating method is 16-QAM, susceptibility to multipath interference is increased, and therefore the multipath interference is suppressed.

When the demodulating method specified in the control signal is 64 QAM (S16, No, and S20, No), the control unit 104 controls the sampling rate supplying unit 112 to set the sampling rate to the maximum value of 16 times the chip rate (S32). Also, the control unit 104 controls the propagation path estimating unit 106 to set the pilot averaging length to the minimum length of six symbols (S34). Incidentally, the control unit 104 may control the despreading unit 102 to set the length (number of pilot symbols) of the pilot signal despread to the minimum length of six symbols. The control unit 104 then controls the interference suppressing unit 113 to suppress multipath interference (S36).

The demodulating method of 64 QAM means that processing is at high speed, and hence that a high sampling rate is required. Since it is expected that a low level of noise is added, on the other hand, it is desirable that the pilot averaging length be reduced so that the instantaneous measurement of an amount of phase rotation takes precedence over the suppression of the noise. Accordingly, the sampling rate is set to the maximum value, and the pilot averaging length is set to the minimum value. When the demodulating method is 64 QAM, susceptibility to multipath interference is increased, and therefore the multipath interference is suppressed.

After the sampling rate and the pilot averaging length are set as described above, the transmitting and receiving device 101 receives communication data (S40). The communication data is digitized by the A/D conversion unit 111, and then despread by the despreading unit 102. The despread communication data is supplied to the data demodulating and decoding unit 105 to be demodulated and decoded. The demodulating and decoding method is specified by the control signal sent to the data demodulating and decoding unit 105. At this time, an amount of phase rotation estimated by the propagation path estimating unit 106 is included in the control signal and is used for phase correction.

The pilot signal is sent in conjunction with the communication data, and is sent to the propagation path estimating unit 106 and the reception quality estimating unit 107 via the A/D conversion unit 111 and the despreading unit 102. On the basis of the pilot signal, the reception quality estimating unit 107 estimates reception quality. The estimated reception quality value is inserted into a user terminal transmission signal by the reception quality bit inserting unit 108, and then the reception quality bit inserting unit 108 outputs a reception quality data signal. The reception quality data signal is modulated by the modulating unit 109, spread by the spreading unit 110, and then transmitted to the base station by the transmitting and receiving device 101.

When the reception of the communication data as described above is completed, the control unit 104 sets the sampling rate to four times the chip rate (S42) and sets the pilot averaging length to 20 symbols (S44). The control unit 104 then stop the suppressing of multipath interference by the interference suppressing unit 113 (S46). That is, the control unit 104 initializes the sampling rate, the pilot averaging length, and the state of operation of the interference suppressing unit 113. Then, the processing returns to the reception of a control signal (S10). Incidentally, the processing is ended at an arbitrary point in time by turning off power.

According to the embodiment of the present invention, the control unit 104 controls the sampling rate of the despreading means (the A/D conversion unit 111 and the despreading unit 102) on the basis of the control signal specifying the demodulating method (QPSK, 16-QAM, or 64 QAM). Thereby the sampling rate for the demodulating method of QPSK or 16-QAM can be set lower as appropriate than for the demodulating method of 64 QAM. For example, the sampling rate can be set equal to eight times the chip rate (16-QAM) or four times the chip rate (QPSK). Thus, a function (setting the sampling rate equal to 16 times the chip rate) provided for the demodulating method (64 QAM) that is most susceptible to deterioration in accuracy may not be performed at all times.

Also, the control unit 104 controls the length (pilot averaging length) of the pilot signal used by the propagation path estimating unit 106 on the basis of the control signal specifying the demodulating method (QPSK, 16-QAM, or 64 QAM). Thereby the length of the pilot signal used by the propagation path estimating unit 106 can be increased as appropriate according to the demodulating method. For example, the pilot averaging length can be set to 10 symbols (16-QAM) or 20 symbols (QPSK). Thus, a function (setting the pilot averaging length to six symbols) provided for the demodulating method (64 QAM) that is most susceptible to deterioration in accuracy may not be performed at all times.

Further, the control unit 104 controls the length of the despread pilot signal on the basis of the control signal specifying the demodulating method (QPSK, 16-QAM, or 64 QAM). Thereby the length of the despread pilot signal can be increased as appropriate according to the demodulating method. For example, the length of the despread pilot signal can be set to 10 symbols (16-QAM) or 20 symbols (QPSK). Thus, a function (setting the length of the despread pilot signal to six symbols) provided for the demodulating method (64 QAM) that is most susceptible to deterioration in accuracy may not be performed at all times.

Further, the control unit 104 controls the state of operation of the interference suppressing unit 113 on the basis of the control signal specifying the demodulating method (QPSK, 16-QAM, or 64 QAM). Thereby the suppression of multipath interference can be controlled according to the demodulating method. For example, the suppression of multipath interference can be controlled to be performed (16-QAM and 64 QAM) or not to be performed (QPSK). Thus, a function (performing the suppression of multipath interference) provided for the demodulating method (16-QAM and 64 QAM) that is most susceptible to deterioration in accuracy may not be performed at all times.

Figure 13:
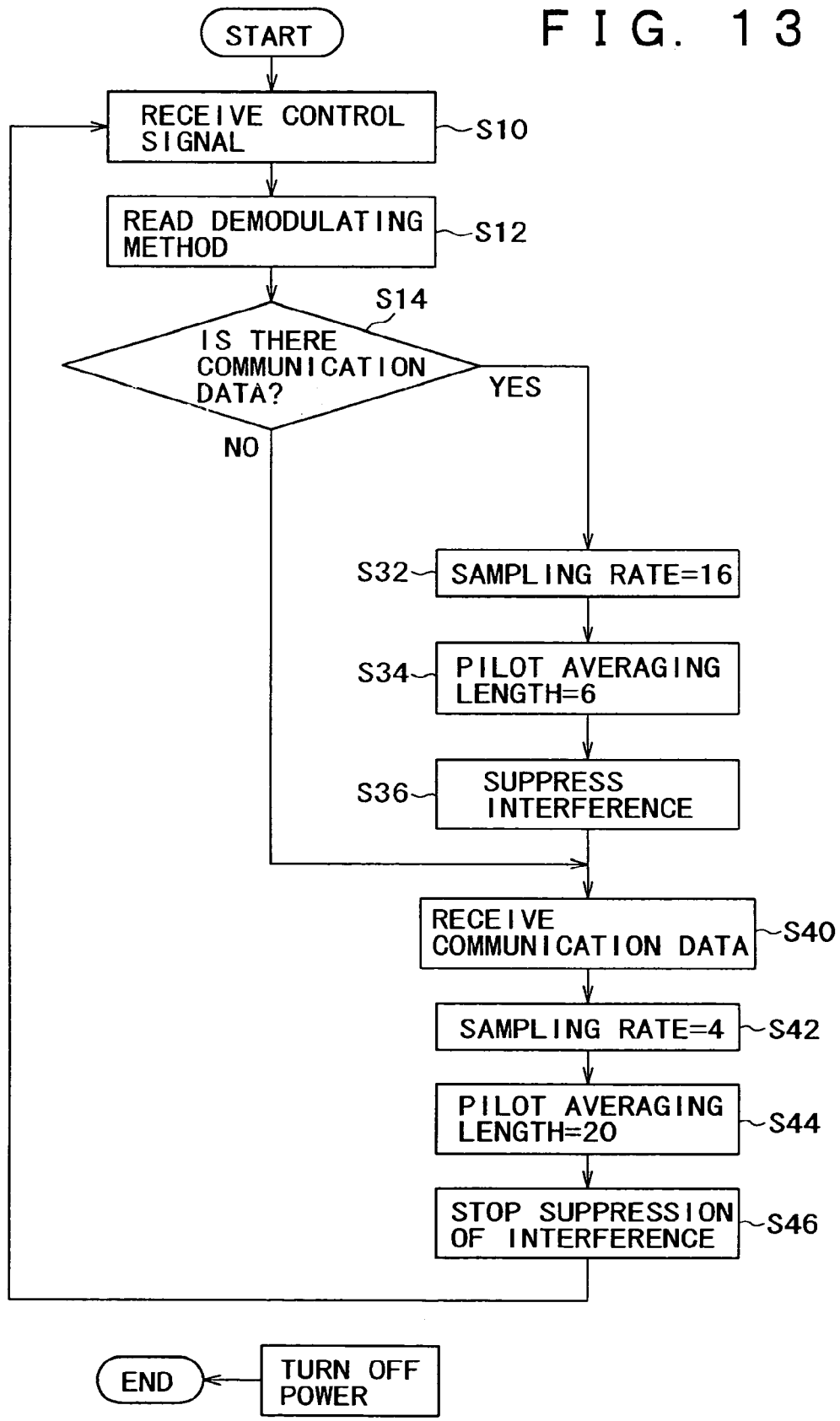
FIG. 13 is a flowchart illustrating operation of a modification of the embodiment of the present invention.

It is to be noted that in the present embodiment, the sampling rate, the pilot averaging length, and the state of operation of the interference suppressing unit 113 are determined on the basis of the modulating method (demodulating method) read from the control signal; however, the sampling rate and the like may be determined according to a type of received signal, that is, according to whether there is only a control signal or whether there is also communication data. This provides similar effects. Operation in this case will be described with reference to a flowchart of FIG. 13.

Figure 12:
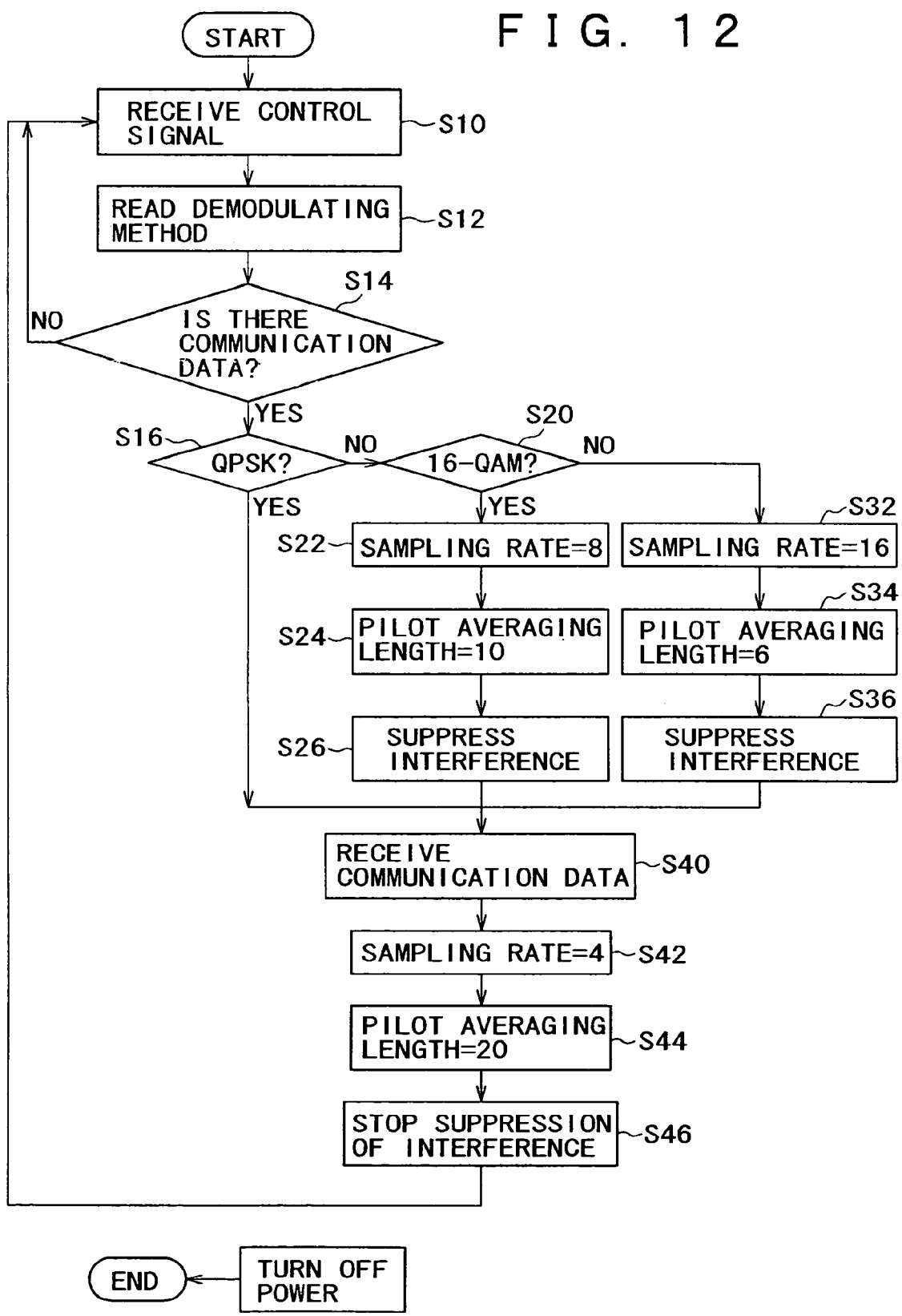
FIG. 12 is a flowchart illustrating operation of the embodiment of the present invention.

The reception of a control signal (S10) and the reading of the demodulating method (S12) are the same as in FIG. 12. Then the control unit 104 determines whether or not communication data is received (S14). When no communication data is received (S14, No), the sampling rate and length of a pilot signal used in obtaining an average (referred to as pilot averaging length) are not changed. When communication data is received (S14, Yes) the control unit 104 controls the sampling rate supplying unit 112 to set the sampling rate to the maximum value of 16 times the chip rate (S32). Also, the control unit 104 controls the propagation path estimating unit 106 to set the pilot averaging length to the minimum length of six symbols (S34). Incidentally, the control unit 104 may control the despreading unit 102 to set the length (number of pilot symbols) of the pilot signal despread to the minimum length of six symbols. The control unit 104 then controls the interference suppressing unit 113 to suppress multipath interference.

The reception of communication data (S40) and processing thereafter are the same as in FIG. 12.

The embodiment described above can be realized as follows. A computer including a CPU, a hard disk, a flash memory, and a media (such as floppy disks, CD-ROMs, memory sticks and the like) reading device makes the media reading device read a medium on which a program for realizing the above-described parts is recorded and then installs the program on the hard disk, in the flash memory or the like. The above-described functions can be realized also by such a method.

A preferred embodiment of the present invention has been described above. However, the present invention is susceptible of various changes.

The invention claimed is:

1. A despreading device receiving a spread signal to be received, said despreading device comprising:
   receiving means for receiving said signal to be received that has communication data and a control signal specifying a demodulating method;
   despreading means for despreading the received signal on the basis of a sampling rate and then outputting said control signal and the communication data;
   sampling rate supplying means for supplying said sampling rate to said despreading means;
   data demodulating means for demodulating the communication data;
   control means for controlling said sampling rate and a demodulating method of the demodulating means on the basis of said control signal; and
   output means for outputting the sampling rate.

2. A propagation path estimating device receiving a spread signal to be received, said propagation path estimating device comprising:
   receiving means for receiving said signal to be received that has communication data, a pilot signal and a control signal specifying a demodulating method;
   despreading means for despreading the received signal, and then outputting said pilot signal and said control signal and the communication data;
   propagation path estimating means for obtaining an amount of phase rotation of said received signal on the basis of said pilot signal;
   data demodulating means for demodulating the communication data;
   control means for controlling a demodulating method of the demodulating means and a length of said pilot signal used by said propagation path estimating means on the basis of said control signal; and
   output means for outputting the pilot signal.

3. A despreading device receiving a spread signal to be received, said despreading device comprising:
   receiving means for receiving said signal to be received that has communication data, a pilot signal and a control signal specifying a demodulating method;
   despreading means for despreading the received signal, and then outputting the communication data, said pilot signal and said control signal;
   control means for controlling a demodulating method of the demodulating means and a length of said pilot signal despread by said despreading means on the basis of said control signal; and
   output means for outputting the pilot signal.

4. A receiving apparatus for receiving a spread signal to be received, said receiving apparatus comprising:
   receiving means for receiving said signal to be received that has communication data and a control signal specifying a demodulating method;
   despreading means for despreading the received signal on the basis of a sampling rate, and then outputting said communication data and said control signal;
   sampling rate supplying means for supplying said sampling rate to said despreading means;
   data demodulating means for demodulating said communication data;
   control means for controlling said sampling rate and a demodulating method of said data demodulating means on the basis of said control signal; and
   output means for outputting the sampling rate.

5. A receiving apparatus for receiving a spread signal to be received, said receiving apparatus comprising:
   receiving means for receiving said signal to be received that has communication data, a pilot signal, and a control signal specifying a demodulating method;
   despreading means for despreading the received signal, and then outputting said communication data, said pilot signal, and said control signal;
   propagation path estimating means for obtaining an amount of phase rotation of said received signal on the basis of said pilot signal;
   data demodulating means for demodulating said communication data on the basis of said amount of phase rotation;
   control means for controlling length of said pilot signal used by said propagation path estimating means and a demodulating method of said data demodulating means on the basis of said control signal; and
   output means for outputting the pilot signal.

6. A receiving apparatus for receiving a spread signal to be received, said receiving apparatus comprising:
   receiving means for receiving said signal to be received that has communication data, a pilot signal, and a control signal specifying a demodulating method;
   despreading means for despreading the received signal, and then outputting said communication data, said pilot signal, and said control signal;
   data demodulating means for demodulating said communication data;
   control means for controlling length of said pilot signal despread by said despreading means and a demodulating method of said data demodulating means on the basis of said control signal; and
   output means for outputting the pilot signal.

* * * * *

UNITED STATES PATENT AND TRADEMARK OFFICE
CERTIFICATE OF CORRECTION

PATENT NO. : 7,283,581 B2  
APPLICATION NO. : 10/343466  
DATED : October 16, 2007  
INVENTOR(S) : Katsutoshi Itoh et al.

It is certified that error appears in the above-identified patent and that said Letters Patent is hereby corrected as shown below:

Title page, Foreign Application Priority Data should read as following:

(30) June 1, 2001................(JP).....2001-166808  
September 14, 2001....(JP).....2001-280117

Signed and Sealed this

First Day of April, 2008

JON W. DUDAS  
*Director of the United States Patent and Trademark Office*